(12) United States Patent
Chang

(10) Patent No.: US 10,060,098 B2
(45) Date of Patent: Aug. 28, 2018

(54) METHOD OF DISPLAYING A DEAD ZONE OF A CONSTRUCTION MACHINE AND APPARATUS FOR PERFORMING THE SAME

(71) Applicant: Doosan Infracore Co., Ltd., Incheon (KR)

(72) Inventor: Kyung-Yul Chang, Incheon (KR)

(73) Assignee: DOOSAN INFRACORE CO., LTD., Incheon (KR)

(*) Notice: Subject to any disclaimer, the term of this patent is extended or adjusted under 35 U.S.C. 154(b) by 241 days.

(21) Appl. No.: 15/069,288

(22) Filed: Mar. 14, 2016

(65) Prior Publication Data

US 2016/0273195 A1 Sep. 22, 2016

(30) Foreign Application Priority Data

Mar. 16, 2015 (KR) .................. 10-2015-0035809

(51) Int. Cl.
*H04N 7/18* (2006.01)
*E02F 9/26* (2006.01)
(Continued)

(52) U.S. Cl.
CPC .................. *E02F 9/26* (2013.01); *E02F 9/24* (2013.01); *E02F 9/261* (2013.01); *E02F 9/264* (2013.01);
(Continued)

(58) Field of Classification Search
CPC ................ B60R 1/00; B60R 2300/607; B60R 2300/105; B60R 2300/303;
(Continued)

(56) References Cited

U.S. PATENT DOCUMENTS 8,593,454 B2 * 11/2013 Kiyota ................. B60R 1/00
345/419
8,797,417 B2 * 8/2014 Gayko ................. G06T 5/005
348/154
(Continued)

FOREIGN PATENT DOCUMENTS

EP 2631374 8/2013
JP 10-37252 A * 2/1998
(Continued)

OTHER PUBLICATIONS

Extended European Search Report from related European Patent Application No. 1619411.7 dated Feb. 15, 2017. 9 pages.
(Continued)

*Primary Examiner* — David E Harvey
(74) *Attorney, Agent, or Firm* — K&L Gates LLP

(57) ABSTRACT

In a method of displaying a dead zone of a construction machine, actual images with respect to omnidirectional views of a cabin in the construction machine may be obtained. A virtual image with respect to the dead zone generated by a working tool, which may be connected to the cabin, may be obtained from the actual images. The virtual image may be displayed on a monitor in the cabin. Thus, a worker in the cabin may accurately acknowledge whether a man or a fixture may exist or not in a region in front of a rotation direction of a boom by seeing the virtual image. Thus, a negligent accident caused by the rotation of the boom may be prevented.

7 Claims, 5 Drawing Sheets

(51) Int. Cl.
  *H04N 5/265* (2006.01)
  *H04N 5/247* (2006.01)
  *H04N 5/232* (2006.01)
  *E02F 9/24* (2006.01)
  *G06T 3/40* (2006.01)
  *E02F 3/28* (2006.01)

(52) U.S. Cl.
  CPC ....... *G06T 3/4038* (2013.01); *H04N 5/23238* (2013.01); *H04N 5/247* (2013.01); *H04N 5/265* (2013.01); *H04N 7/181* (2013.01); *B60R 2300/202* (2013.01); *B60R 2300/802* (2013.01); *E02F 3/28* (2013.01)

(58) Field of Classification Search
  CPC ......... B60R 2300/102; B60R 2300/304; E02F 9/26; E02F 9/264; E02F 9/24; E02F 9/261; H04N 5/265; H04N 5/247; H04N 5/23238; H04N 7/181; G06T 3/4038
  See application file for complete search history.

(56) References Cited

U.S. PATENT DOCUMENTS

| | | | | |
|---|---|---|---|---|
| 2003/0108222 | A1* | 6/2003 | Sato | H04N 7/183 382/104 |
| 2006/0034535 | A1* | 2/2006 | Koch | E02F 9/26 382/254 |
| 2008/0129539 | A1* | 6/2008 | Kumon | B60R 1/00 340/901 |
| 2010/0289899 | A1* | 11/2010 | Hendron | B60R 1/00 348/148 |
| 2011/0044505 | A1* | 2/2011 | Lim | G06K 9/00771 382/103 |
| 2012/0113261 | A1* | 5/2012 | Satoh | B60R 1/00 348/148 |
| 2012/0176497 | A1* | 7/2012 | Shadmi | G01C 21/00 348/144 |
| 2013/0182066 | A1* | 7/2013 | Ishimoto | H04N 7/181 348/38 |
| 2013/0222594 | A1* | 8/2013 | Kiyota | G06T 3/4038 348/148 |
| 2013/0278772 | A1* | 10/2013 | Yun | B60K 35/00 348/148 |
| 2014/0118533 | A1* | 5/2014 | Chang | B60R 1/00 348/118 |
| 2014/0257647 | A1* | 9/2014 | Wu | E02F 9/24 701/50 |
| 2014/0354813 | A1* | 12/2014 | Ishimoto | H04N 7/181 348/148 |
| 2015/0070394 | A1* | 3/2015 | Yanagawa | G06T 3/0018 345/649 |
| 2015/0077281 | A1* | 3/2015 | Taniguchi | B60R 1/00 342/27 |
| 2015/0138356 | A1 | 5/2015 | Kowatari et al. | |
| 2015/0220777 | A1* | 8/2015 | Kauffmann | G06K 9/00362 382/103 |
| 2015/0368881 | A1* | 12/2015 | Baeumchen | B60R 1/00 348/148 |
| 2016/0305094 | A1* | 10/2016 | Chang | E02F 9/264 |
| 2016/0344931 | A1* | 11/2016 | Husted | H04N 5/23238 |
| 2017/0120817 | A1* | 5/2017 | Kuehnle | B60R 1/00 |
| 2017/0132476 | A1* | 5/2017 | Chien | G06K 9/00791 |
| 2018/0120098 | A1* | 5/2018 | Matsuo | E02F 9/26 |

FOREIGN PATENT DOCUMENTS

| | | | |
|---|---|---|---|
| JP | 10-299032 A | * | 11/1998 |
| JP | 2002314990 A | * | 10/2002 |
| JP | 2009007860 | | 1/2009 |
| JP | 2010-059653 A | * | 3/2010 |
| JP | 2010-204821 A | * | 9/2010 |
| JP | 2011066763 | | 3/2011 |
| KR | 20110067683 | | 6/2011 |
| KR | 2013-0088051 | | 8/2013 |
| WO | WO 2012/102513 A2 | * | 2/2012 |

OTHER PUBLICATIONS

Partial Search Report from related European Patent Application No. 16160253.7 dated Aug. 17, 2016. 8 pages.

* cited by examiner

METHOD OF DISPLAYING A DEAD ZONE OF A CONSTRUCTION MACHINE AND APPARATUS FOR PERFORMING THE SAME

CROSS-REFERENCE TO RELATED APPLICATION

This application claims priority under 35 USC § 119 to Korean Patent Application No. 10-2015-0035809, filed on Mar. 16, 2015 in the Korean Intellectual Property Office (KIPO), the contents of which are herein incorporated by reference in their entirety.

FIELD OF THE DISCLOSURE

Example embodiments relate to a method of displaying a dead zone of a construction machine and an apparatus for performing the same. More particularly, example embodiments relate to a method of displaying a dead zone formed by a boom of an excavator on a monitor of a cabin in the excavator, and an apparatus for performing the method.

BACKGROUND OF THE DISCLOSURE

Generally, an excavator may include a lower driving body, an upper swing body pivotally connected to the lower driving body, a boom connected to the upper swing body, an arm connected to the boom, and an attachment selectively connected to the arm. The attachment may include a bucket, breaker, crusher, etc.

When the boom may be rotated, a worker in a cabin may not see a front, a rear and sides of the cabin at the same time. Thus, when a man or a fixture may exist in front of the cabin, a negligent accident may be generated.

According to related arts, a camera may be installed at the cabin. An image photographed by the camera may be displayed on a monitor in the cabin. The worker may rotate the boom with seeing the image on the monitor to prevent the generation of the negligent accident.

However, a dead zone may be generated due to the rotated boom. The camera may not photograph the dead zone. Thus, an image of the dead zone may not be displayed on the monitor so that the worker in the cabin may not see the dead zone screened by the rotated boom.

SUMMARY

Example embodiments provide a method of displaying a dead zone of a construction machine that may be capable of accurately displaying the dead zone generated by a rotation of a boom.

Example embodiments also provide an apparatus for performing the above-mentioned method.

According to example embodiments, there may be provided a method of displaying a dead zone of a construction machine. In the method of displaying the dead zone of the construction machine, actual images with respect to omnidirectional views of a cabin in the construction machine may be obtained. A virtual image with respect to the dead zone generated by a working tool, which may be connected to the cabin, may be obtained from the actual images. The virtual image may be displayed on a monitor in the cabin.

In example embodiments, the actual images may include front actual images, rear actual images and side actual images of the cabin.

In example embodiments, the method may further include detecting a rotation of the cabin.

In example embodiments, the method may further include measuring a rotation angle of the working tool, detecting the dead zone by a rotation of the working tool, and measuring a position of the dead zone.

In example embodiments, the method may further include measuring a substitutive dead zone of the working tool in accordance with a rotational direction and the rotation angle of the working tool.

In example embodiments, obtaining the virtual image of the dead zone may include synthesizing at least one previous image, which may be obtained by previously photographing the dead zone, with a present image of the dead zone.

In example embodiments, the construction machine may include an excavator. The working tool may include a boom of the excavator.

According to example embodiments, there may be provided an apparatus for displaying a dead zone of a construction machine. The apparatus may include a camera unit, an image-matching unit, a controlling unit and a displaying unit. The camera unit may be configured to obtain actual images with respect to omnidirectional views of a cabin in the construction machine. The image-matching unit may be configured to process the actual images. The controlling unit may be configured to obtain a virtual image with respect to the dead zone generated by a working tool, which may be connected to the cabin, among the actual images. The displaying unit may be configured to display the virtual image obtained by the controlling unit.

In example embodiments, the camera unit may include a front camera configured to photograph a front of the cabin, a rear camera configured to photograph a rear of the cabin, a right side camera configured to photograph a right side of the cabin and a left side camera configured to photograph a left side of the cabin.

In example embodiments, the image-matching unit may be configured to synthesize at least one previous image, which may be obtained by previously photographing the dead zone, with a present image of the dead zone by a control signal of the controlling unit.

In example embodiments, the apparatus may further include a rotation-detecting unit configured to detect a rotation of the cabin and to transmit a detected cabin rotation to the controlling unit.

In example embodiments, the apparatus may further include a rotation angle-measuring unit configured to measure of a rotation angle of the working tool and to transmit a measured rotation angle to the controlling unit.

In example embodiments, the apparatus may further include a dead zone-detecting unit configured to detect positions of the dead zone in accordance with rotations of the working tool.

In example embodiments, the construction machine may include an excavator. The working tool may include a boom of the excavator.

According to example embodiments, the actual images photographed by the camera unit may be processed to obtain the virtual image of the dead zone generated by the rotation of the boom. A worker in the cabin may accurately acknowledge whether a man or a fixture may exist or not in a region in front of the rotation direction of the boom by seeing the virtual image on the displaying unit. Thus, a negligent accident caused by the rotation of the boom may be prevented.

BRIEF DESCRIPTION OF THE DRAWINGS

Example embodiments will be more clearly understood from the following detailed description taken in conjunction with the accompanying drawings.

FIG. 1 is a block diagram illustrating an apparatus for displaying a dead zone of a construction machine in accordance with example embodiments;

FIG. 2 is a flow chart illustrating a method of displaying the dead zone of the construction machine using the apparatus in FIG. 1; and FIGS. 3 to 8 are images displayed by the method in FIG. 2.

DETAILED DESCRIPTION

Figure 1:
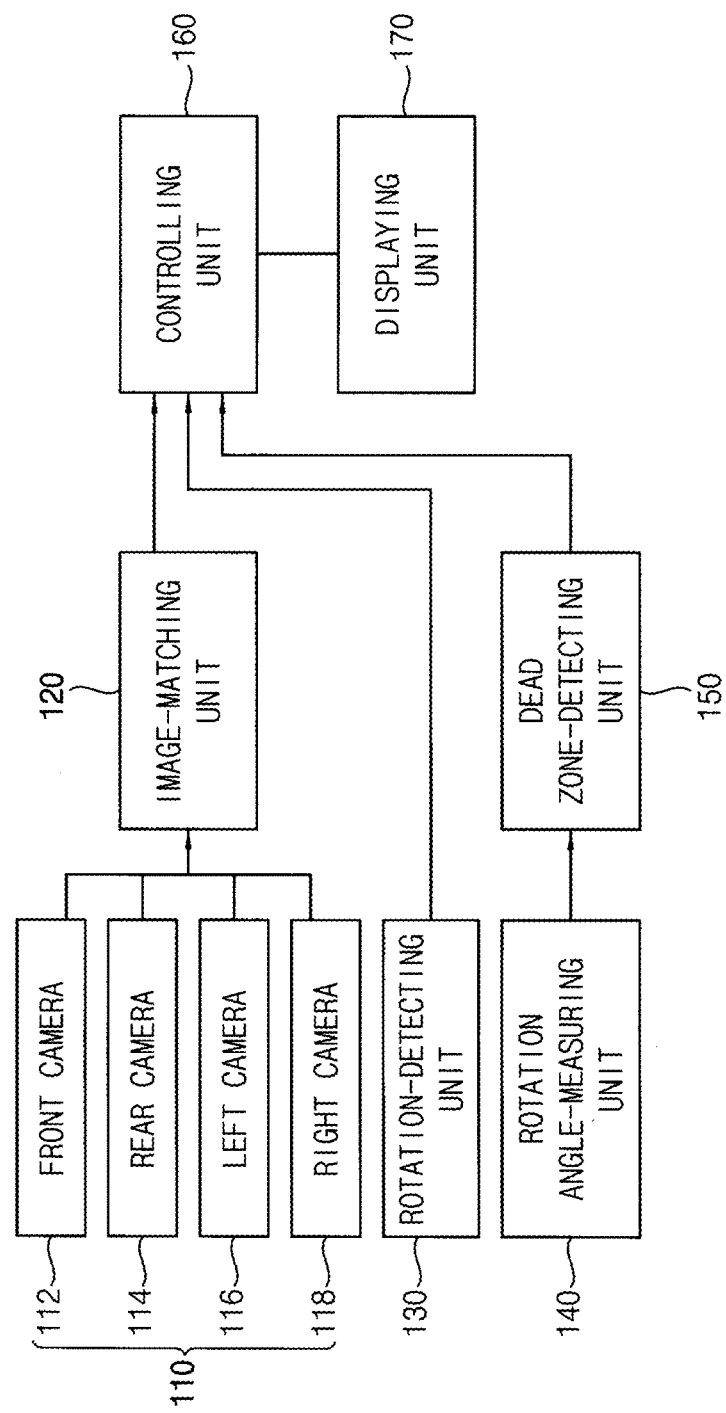
FIGS. 1 to 8 represent non-limiting, example embodiments as described herein.

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Apparatus for Displaying a Dead Zone of a Construction Machine

FIG. 1 is a block diagram illustrating an apparatus for displaying a dead zone of a construction machine in accordance with example embodiments.

Referring to FIG. 1, an apparatus for displaying a dead zone of a construction machine in accordance with this example embodiment may include a camera unit 110, an image-matching unit 120, a rotation-detecting unit 130, a rotation angle-measuring unit 140, a dead zone-detecting unit 150, a controlling unit 160 and a displaying unit 170.

In example embodiments, the construction machine may include a cabin and a working tool connected to the cabin. For example, the construction machine may include an excavator. The excavator may include a lower driving body, an upper swing body pivotally connected to the lower driving body, a boom as the working tool connected to the upper swing body, an arm connected to the boom, and an attachment selectively connected to the arm. A worker in the cabin may not see a dead zone screened by the rotated boom. The dead zone may correspond to a zone positioned in front of a rotation direction of the boom and screened by the boom. Alternatively, the apparatus may be applied to other construction machines as well as the excavator.

The camera unit 110 may be configured to obtain actual images with respect to omnidirectional views of the cabin in the excavator. That is, the camera unit 110 may photograph views shown from the cabin to obtain the actual images. The actual images photographed by the camera unit 110 may be displayed on the displaying unit 170. Thus, an around view monitoring (AVM) system may be applied to the excavator.

The camera unit 110 may include a front camera 112, a rear camera 114, a left camera 116 and a right camera 118. The front camera 112 may be installed at a front of the cabin to photograph front views of the cabin. The rear camera 114 may be installed at a rear of the cabin to photograph rear views of the cabin. The left camera 116 may be installed at a left side of the cabin to photograph left views of the cabin. The right camera 118 may be installed at a right side of the cabin to photograph right views of the cabin. Thus, the actual images may include front actual images, rear actual images, left actual images and right actual images. Alternatively, the camera unit 110 may include two cameras, three cameras or at least five cameras.

The actual images photographed by the camera unit 110 may be transmitted to the image-matching unit 120. The image-matching unit 120 may be configured to continuously match the actual images. For example, the image-matching unit may synthesize a previously photographed actual image with a presently photographed actual image to form a virtual image. The matched images by the image-matching unit 120 may be transmitted to the controlling unit 160.

The rotation-detecting unit 130 may be configured to detect a rotation of the cabin. Because the dead zone may be changed in accordance with the rotation of the cabin, the rotation-detecting unit 130 may detect the rotation of the cabin. The rotation-detecting unit 130 may transmit a detected rotation of the cabin to the controlling unit 160.

The rotation angle-measuring unit 140 may be configured to measure a rotation direction and a rotation angle of the boom. Because the dead zone may be changed in accordance with the rotation direction and the rotation angle of the boom, the rotation angle-measuring unit 130 may measure the rotation direction and the rotation angle of the boom. The rotation angle-measuring unit 130 may transmit a rotated direction and a rotated angle of the boom to the controlling unit 160.

The dead zone-detecting unit 150 may be configured to detect positions of the dead zone generated in accordance with the rotation direction and the rotation angle of the boom measured by the rotation angle-measuring unit 140. Because the dead zone may be continuously changed in accordance with the rotation angle of the boom, the dead zone-detecting unit 150 may detect the positions of the dead zone in accordance with the rotation angles of the boom. The dead zone-detecting unit 150 may transmit a detected position of the dead zone to the controlling unit 160.

As mentioned above, the controlling unit 160 may continuously receive the virtual images from the image-matching unit 120. The controlling unit 160 may receive information with respect to the rotation of the cabin from the rotation-detecting unit 130. The controlling unit 160 may receive information with respect to the positions of the dead zone from the dead zone-detecting unit 150. The controlling unit 160 may measure a substitutive dead zone. The substitutive dead zone may correspond to a dead zone defined by a present front camera 112, but not a dead zone defined by a previous left camera 116. The controlling unit 160 may select a virtual image among the virtual images, which may correspond to a present dead zone at a present position of the boom, based on the information. The controlling unit 160 may transmit the selected virtual image to the displaying unit 170.

The displaying unit 170 may be configured to display the transmitted virtual image. The displaying unit 170 may include a monitor in the cabin. The virtual image on the displaying unit 170 may correspond to an image obtained by synthesizing a previous image of the dead zone just before photographed by the left camera 116, i.e., a previous image of the substitutive dead zone photographed by the left camera 116 with a present image presently photographed by the front camera 112. A zone at the present position of the front camera 112 may correspond to the dead zone. However, the zone at the previous position of the left camera 116 may not correspond to the dead zone. Thus, the man or the fixture may not be shown on the present image because the man or the fixture may be screened by the boom. However, the man or the fixture may be shown in the previous image because the man or the fixture may not be screened by the boom. Therefore, the virtual image obtained by synthesizing the previous image with the present image may display the man or the fixture. As a result, the worker in the cabin may recognize the existence of the man or the fixture in the dead zone by seeing the virtual image on the displaying unit 170.

Method of Displaying a Dead Zone of a Construction Machine

Figure 2:
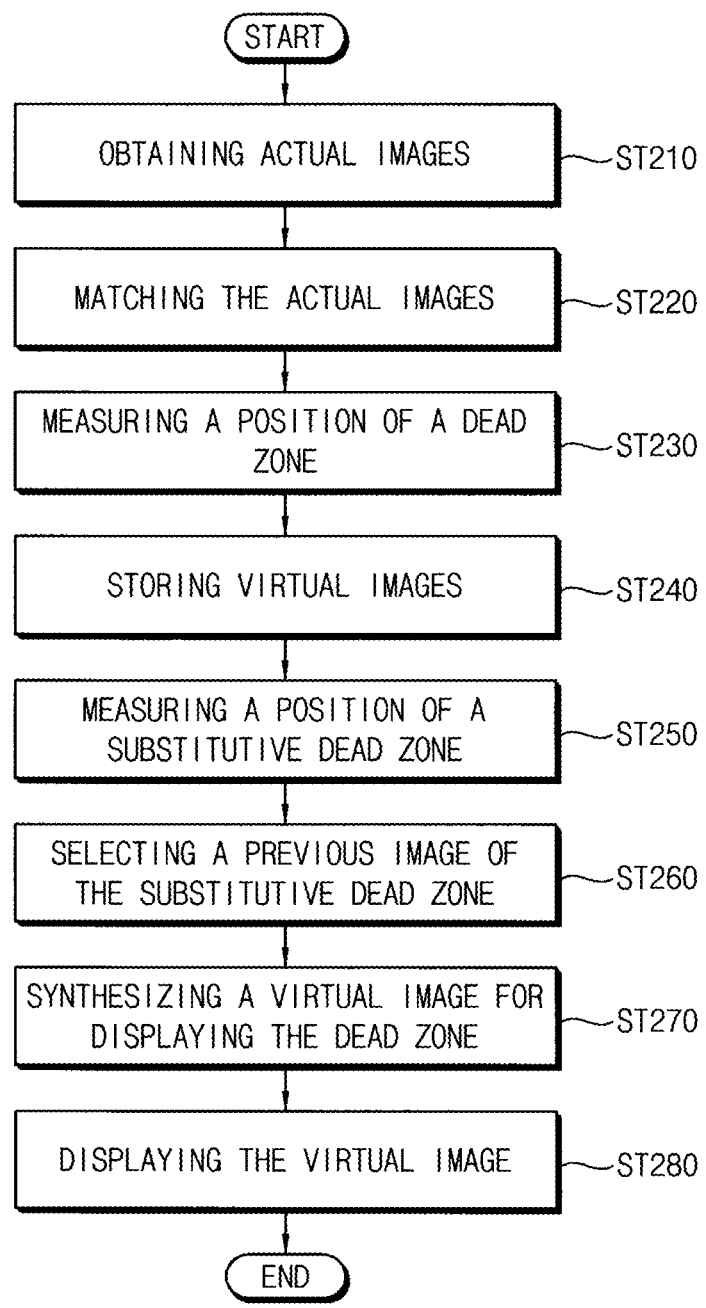

FIG. 2 is a flow chart illustrating a method of displaying the dead zone of the construction machine using the apparatus in FIG. 1, and FIGS. 3 to 8 are images displayed by the method in FIG. 2.

Referring to FIGS. 1 and 2, in step ST210, the camera unit 110 may obtain the actual images with respect to the omnidirectional views of the cabin in the excavator. The camera unit 110 may photograph the views from the cabin to obtain the actual images. The actual images may include the front actual images photographed by the front camera 112, the rear actual images photographed by the rear camera 114, the left actual images photographed by the left camera 116, and the right actual images photographed by the right camera 118.

In step ST220, the image-matching unit 120 may continuously match the actual images. For example, the front camera 112 and the left camera 116 may photograph a zone by a time interval by the rotation of the cabin to obtain two actual images. The two actual images may show the same zone. The image-matching unit 120 may synthesize the two actual images with each other to from a virtual image. The image-matching unit 120 may continuously form the virtual images. The virtual images may be transmitted to the controlling unit 160.

Figure 3:
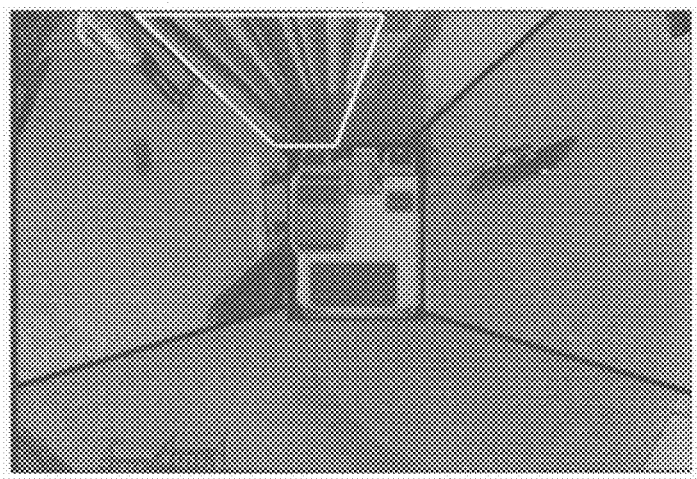

In step ST230, the rotation angle-measuring unit 140 may measure the rotation angle of the boom. The measured rotation angle of the boom may be transmitted to the dead zone-detecting unit 150. The dead zone-detecting unit 150 may determine whether the dead zone may be generated or not in accordance with the rotation angle of the boom. When the dead zone may be generated, as shown in FIG. 3, the dead zone-detecting unit 150 may measure a position of the dead zone.

Figure 4:
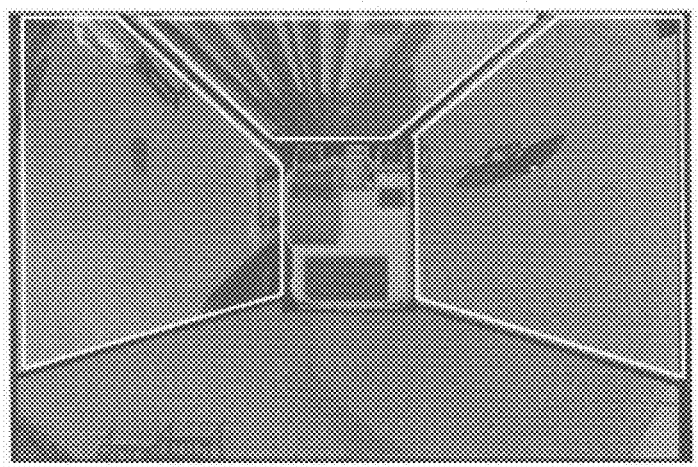

In step ST240, as shown in FIG. 4, the controlling unit 160 may store a virtual image corresponding to the dead zone among the transmitted virtual images. Because the dead zone may be continuously changed in accordance with the continuous rotation of the boom, the controlling unit 160 may continuously store the virtual images corresponding to the continuously changed dead zones.

Figure 5:
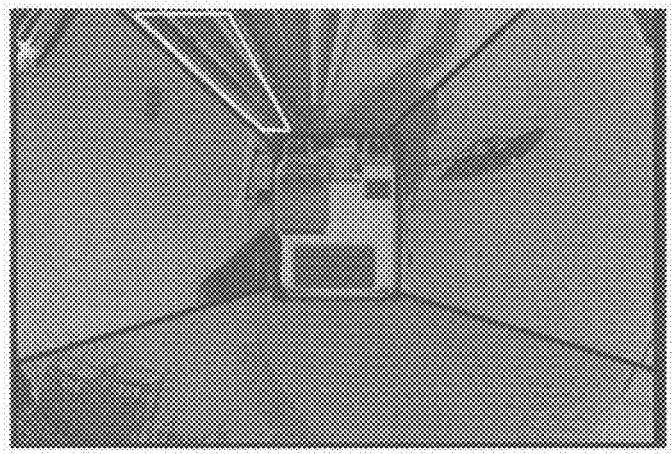

In step ST250, the rotation-detecting unit 130 may detect the rotation of the cabin. The detected rotation of the cabin may be transmitted to the controlling unit 160. As shown in FIG. 5, the controlling unit 160 may measure a position of the substitutive dead zone of the boom based on the information with respect to the rotation of the boom.

Figure 6:
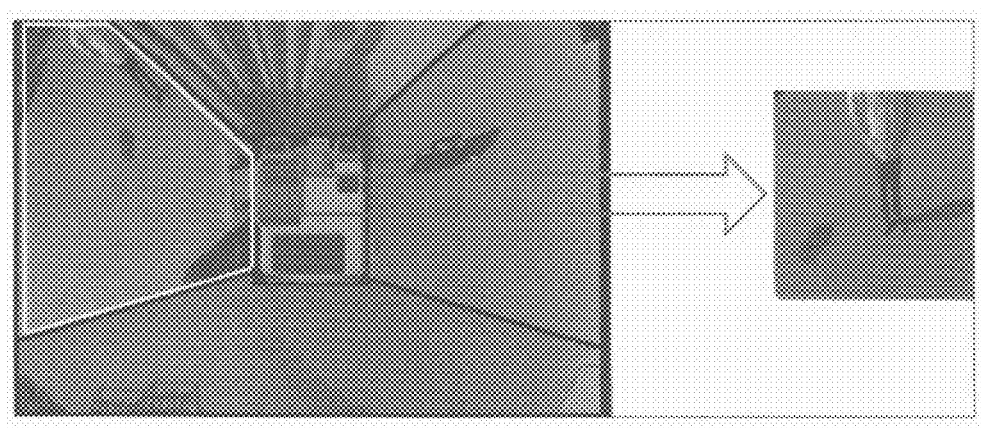

In step ST260, as shown in FIG. 6, the controlling unit 160 may select a previous image of the substitutive dead zone corresponding to the present dead zone. The previous image may show a man not shown on the present image.

Figure 7:
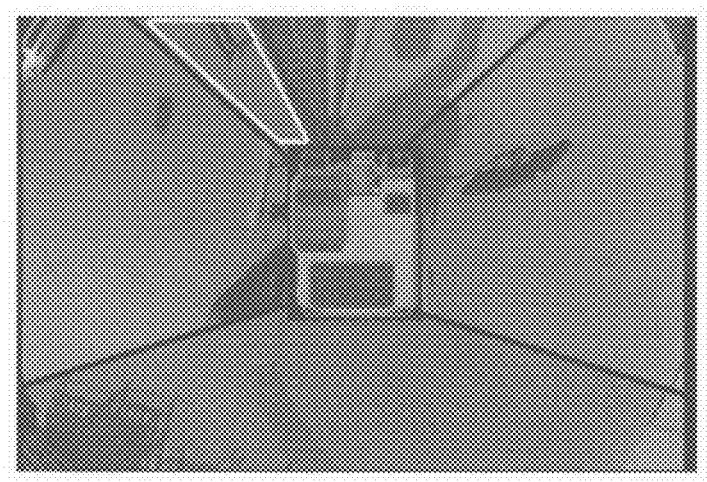

In step ST270, the controlling unit 160 may synthesize the previous image of the substitutive dead zone with the present image of the present dead zone to form a virtual image of the dead zone. As shown in FIG. 7, although the present image of the present dead zone may not show the man due to the boom, the previous image of the substitutive dead zone may show the man. Thus, the virtual image of the dead zone may show the man.

Figure 8:
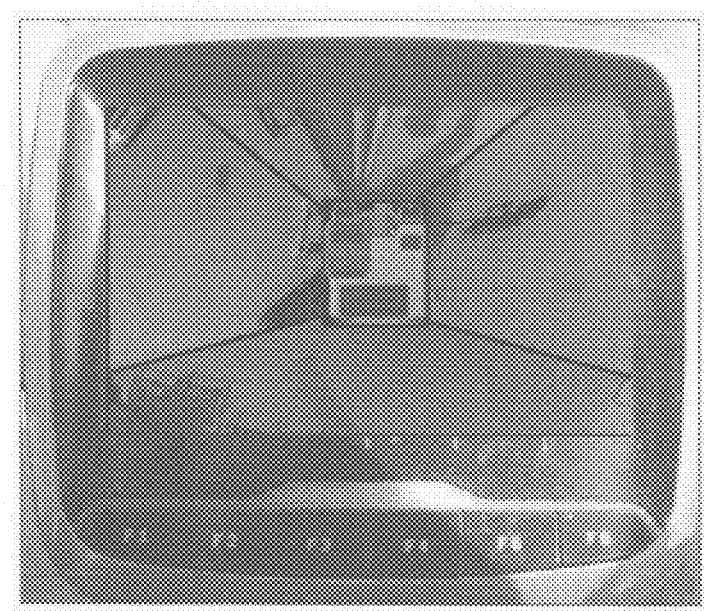

In step ST280, as shown in FIG. 8, the displaying unit 170 may display transmitted from the controlling unit 160. Because the man may exist in the virtual image displayed on the displaying unit 170, the worker may recognize the main in the dead zone by seeing the virtual image so that the negligent accident may be prevented.

According to example embodiments, the actual images photographed by the camera unit may be processed to obtain the virtual image of the dead zone generated by the rotation of the boom. A worker in the cabin may accurately acknowledge whether a man or a fixture may exist or not in a region in front of the rotation direction of the boom by seeing the virtual image on the displaying unit. Thus, a negligent accident caused by the rotation of the boom may be prevented.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of displaying a dead zone of a construction machine, the method comprising:
   obtaining actual images with respect to omnidirectional views of a cabin in the construction machine;
   measuring a rotation angle of a working tool connected to the cabin;
   detecting the dead zone in accordance with the rotation angle of the working tool;
   measuring a position of the dead zone;
   obtaining a previous image of a substitutive dead zone of the working tool in accordance with the rotation angle and a rotation direction of the working tool;
   synthesizing any one of the actual images corresponding to the dead zone with the previous image of the substitutive dead zone to form a virtual image of the dead zone; and
   displaying the virtual image on a displaying unit of the cabin.

2. The method of claim 1, wherein the actual images comprise a front actual image, a rear actual image, a left actual image and a right actual image of the cabin, and the previous image of the substitutive dead zone is obtained from the left actual image.

3. The method of claim 1, further comprising detecting a rotation of the cabin.

4. The method of claim 1, wherein the construction machine comprises an excavator, and the working tool comprises a boom of the excavator.

5. An apparatus for displaying a dead zone of a construction machine, the apparatus comprising:
   a camera unit configured to obtain actual images with respect to omnidirectional views of a cabin in the construction machine;
   an image-matching unit comprising a processor and a memory wherein the memory contains instructions for causing the processor to process the actual images obtained from the camera unit;
   a controlling unit comprising a processor and a memory wherein the memory contains instructions for causing the processor to obtain a virtual image with respect to the dead zone generated by a working tool, which is connected to the cabin, among the actual images processed by the image-matching unit;
   a displaying unit configured to display the virtual image obtained by the controlling unit;
   a rotation-detecting unit comprising a processor and a memory wherein the memory contains instructions for causing the processor to detect a rotation of the cabin and to transmit a signal of the detected rotation to the controlling unit;
   a rotation angle-measuring unit comprising a processor and a memory wherein the memory contains instructions for causing the processor to measure a rotation angle of the working tool and to transmit a signal of the measured angle to the controlling unit; and
   a dead zone-detecting unit comprising a processor and a memory wherein the memory contains instructions for causing the processor to detect a position of the dead zone in accordance with a rotation angle of the working tool,
   wherein the camera unit comprises:
   a front camera configured to photograph a front of the cabin,
   a rear camera configured to photograph a rear of the cabin,
   a left camera configured to photograph a left of the cabin, and
   a right camera configured to photograph a right of the cabin,
   wherein the image-matching unit is configured to synthesize at least one previous image obtained by previously photographing the dead zone with a present image of the dead zone by a control signal of the controlling unit, and
   wherein the controlling unit is configured to synthesize any one of the actual images corresponding to the dead zone with a previous image of a substitutive dead zone of the working tool in accordance with the rotation angle and a rotation direction of the working tool to form a virtual image of the dead zone.

6. The apparatus of claim 5, wherein the construction machine comprises an excavator, and the working tool comprises a boom of the excavator.

7. The apparatus of claim 5, wherein the previous image of the substitutive dead zone corresponds to a portion of an image photographed by the left camera.

* * * * *